March 24, 1925.  A. H. DAVIES ET AL  1,531,261
PRODUCTION OF COLORING MATTERS
Filed Nov. 14, 1921
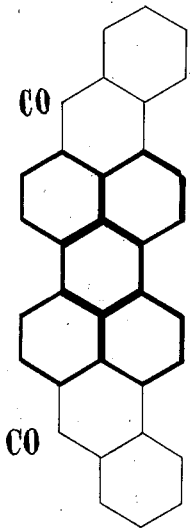
Dibenzanthrone Patented Mar. 24, 1925.

1,531,261

UNITED STATES PATENT OFFICE.

ARTHUR HUGH DAVIES, DECEASED, LATE OF WILLENHALL, ENGLAND, BY MARY OLIVIA DAVIES, ADMINISTRATRIX, OF WILLENHALL, ENGLAND, AND ROBERT FRASER THOMSON, OF CARLISLE, ENGLAND, ASSIGNORS TO SCOTTISH DYES, LIMITED, OF CARLISLE, ENGLAND.

PRODUCTION OF COLORING MATTERS.

Application filed November 14, 1921. Serial No. 515,087.

*To all whom it may concern:*

Be it known that we, MARY OLIVIA DAVIES, administratrix of the estate of the late ARTHUR HUGH DAVIES, a subject of the King of Great Britain and Ireland, and residing at 72 New Road, Willenhall, in the county of Stafford, England, and ROBERT FRASER THOMSON, a subject of the King of Great Britain and Ireland, and residing at Murrell Hill Works, Carlisle, in the county of Cumberland, England, do hereby declare that the said ARTHUR HUGH DAVIES, deceased, and ROBERT FRASER THOMSON, have invented certain new and useful Improvements in the Production of Coloring Matters, of which the following is a specification.

This invention relates to the production of coloring matters either as dyes or intermediates for the production of dyes.

It has for its object to provide an improved or new series of such coloring matters. We have made a large number of experiments and have found, first, that there is a new series of oxidation products, and second, that these oxy-derivatives may be submited to the processes of alkylation including arylation and alphylation and acylation and that the bodies in both cases can act as dyes or intermediates for the production of dyes. We have discovered how to prepare these bodies and also how to apply them. So far as we are aware the whole of the series are new with the exception that one of them, namely, the oxidation product from dibenzanthrone, has heretofore been described.

The members of the series to which we have referred have a connecting link in that they are bodies which according to conventional notations may be regarded as containing the perylene nucleus.

We have found that derivatives of perylene such as the dibenzanthrones are capable of yielding on oxidation bodies which are themselves capable of being used as dyestuffs, and also can be used for the production of further dyestuffs.

We have also found that these oxidation products are capable of being reduced, but not necessarily back to the parent body, by such substances as sulphites.

Either the oxidation products or the reduced bodies can be made to yield under suitable conditions (examples of which are given below) acyl derivatives or alkyl derivatives, which bodies possess extremely valuable properties as dyestuffs.

We have also found that either the oxidation products or their alkylated or acylated derivatives can form additive compounds with sulphuric acid. These can be used as a means of isolating the required bodies as these sulphuric acid compounds are readily decomposed on treatment with excess of water giving the oxidation products or their derivatives in a form suitable for use in further reactions or themselves as dyestuffs.

The following may be cited as illustrating the class of bodies which can be treated in this way:—dibenzanthrone, dinapthodibenzanthrone.

The accompanying diagram represents in a conventional manner what may be regarded as the constitutional formulæ of dibenzanthrone, the perylene ring system being shown in heavy lines.

In Table 1, a list is given of some of the oxidation products subsequently reduced derived from bodies containing the perylene nucleus together with the colour of the body in strong sulphuric acid, and the colour of cotton dyed with the product from an alkaline hydrosulphite bath.

| Oxidized body subsequently reduced derived from the product of the caustic fusion of— | Colour in strong $H_2SO_4$. | Colour of dyed cotton |
|---|---|---|
| Benzanthrone | Red violet | Yellow olive. |
| (bz) Chlor-benzanthrone (that is, chlor-benzanthrone with the chlorine atom in the benzine ring) (oxidized with $M_nO_2$ and $H_2SO_4$). | Olive green | Olive. |
| (bz) Chlor-benzanthrone (nitrated, reduced, diazotized and boiled). | Olive green | Green. |
| Chlor-benzanthrone (from 2-chloranthraquinone, the chlorine atom being in the anthraquinone nucleus). | Brown | Greenish-blue. |
| Chlor-benzanthrone (from 1-chloranthraquinone). | Violet | Olive. |
| Naphtho-benzanthrone | Green | Purplish-grey. |

In Table 2 a summary is given of some of the results that can be obtained by treating these oxidation products or their reduced derivatives with alkylating or acylating agents. The table is not to be taken as exhaustive but as illustrative of the products that can be manufactured by the processes claimed in this invention. We have generally speaking found the reaction to proceed more rapidly and smoothly with the reduced derivatives than with the crude oxidation products but the alkylated or acylated products appear to be the same in both cases.

Table 2.

| Oxidized body subsequently reduced derived from the product of the caustic fusion of— | Condensed with— | Colour of dye on cotton |
|---|---|---|
| Benzanthrone | Dimethyl-sulphate | Brilliant-green. |
| Benzanthrone | Ethylene dibromide | Greenish-blue. |
| Benzanthrone | Benzal chloride | Reddish-blue. |
| Benzanthrone | Di-ethyl sulphate | Bluish violet. |
| Benzanthrone | Propylenedibromide | Greenish-blue. |
| Benzanthrone | Stilbenedibromide | Blue. |
| Benzanthrone | Methylene dibromide | Violet. |
| (bz) Chlor-benzanthrone (oxidation with $MnO_2$ and $H_2SO_4$). | Dimethyl-sulphate | Greenish-blue. |
| (bz) Chlor-benzanthrone (nitrated, reduced, diazotized and boiled). | Dimethyl-sulphate | Reddish-blue. |
| Benzanthrone | Diphenyl-dichlormethane. | Blue. |
| Benzanthrone | O-chlor-benzal-chloride | Reddish-blue. |
| Benzanthrone | M-nitro-benzal-chloride | Reddish-blue. |
| Chlor-benzanthrone (from 2-chlor-anthraquinone). | Dimethyl-sulphate | Blue. |
| Chlor-benzanthrone (from 1-chlor-anthraquinone). | Dimethyl-sulphate | Green. |
| Benzanthrone | Omega-dibromacetophenone. | Violet. |
| Benzanthrone | Phosphorous pentachloride. | Violet. |
| Benzanthrone | Omega-dibrom-2-methylanthraquinone. | Bluish-grey. |
| Naphtho-benzanthrone | Dimethyl-sulphate | Reddish-blue. |
| Benzanthrone | Sulphur chloride | Grey. |
| Benzanthrone | Benzoyl-chloride | Lilac. |
| Benzanthrone | P-nitro-benzoyl-chloride | Purple. |
| Benzanthrone | Succinyl-chloride | Violet. |
| Benzanthrone | Phosphorous penta-sulphide. | Violet. |
| Benzanthrone | Sulphuryl chloride | Brown. |

This invention in brief, consists in the organic derivatives and methods for their preparation, of oxidation products of ketonic perylenes, but we note that in our copending application, Serial No. 659,233 (a division of the present case), we have particularly covered the body produced by the treatment of the oxidation products of dibenzanthrone with dimethyl sulphate (probably dimethoxy debenzanthrone).

The invention includes the organic derivatives derived from the aforesaid oxidation products which have been treated by the action of mild reducing agents including the body prepared by the treatment of the oxidation product of dibenzanthrone with dimethyl sulphate after the aforesaid oxidation product has been so reduced.

In particular the invention deals with alkyl derivatives, that is, derivatives containing a monovalent or divalent radicle of the lower members of the aliphatic or aromatic series of known or hypothetical alcohols or simple substituted derivatives of these alcohols, for example, methyl $CH_3-$; ethylene—$CH_2.CH_2-$; benzal $C_6H_5-CH=$; diphenyl methylene $(C_6H_5)_2C=$.

By ketonic perylenes we mean those bodies containing the perylene nucleus which have other pairs of ring formations joined to the perylene nucleus at the positions commonly indicated as 3:4 and 3':4' and which have in these additional ring formations at least one ketonic group, that is, the whole molecule contains at least one pair of ketonic groups.

The following examples are given to illustrate methods for the production of oxidation products of bodies containing a perylene nucleus as referred to above and their subsequent acylation or alkylation.

*Example I.*

10 parts of purified dibenzanthrone dissolved in 200 parts of sulphuric acid, 66° Bé., and 5 parts of crystalline boric acid are treated with 10 parts of manganese dioxide and 20 parts of sulphuric acid, 66° Bé., at such a rate that the temperature rises to 60° C., at which temperature the whole is then kept for one hour. The oxidation product is isolated according to well-known methods. This dyestuff gives a dull olive green shade on cotton which becomes dull grey-blue on making acid.

Ten parts of dried oxidation product are suspended in one hundred parts of dry nitrobenzene, and ten parts of dry sodium carbonate added along with ten parts of dimethyl sulphate. A rise in temperature occurs, and the mixture is then heated to boiling for three hours, cooled, and 10 parts of sodium carbonate dissolved in 200 parts of water added, and the nitrobenzene distilled off by means of steam. The product is filtered off, and may be used direct as a dyestuff paste. It consists of a blue-green paste, which dissolves in alkaline hydrosulphite with a blue colour, and dyes cotton bright greenish-blue shades, which shades are fast to the action of chlorine and acids. The dry product dissolves in sulphuric acid with a red-violet colour which is unaltered by addition of a reducing agent such as metallic copper.

*Example II.*

The methylated dyestuff described in Example I may be separated in a pure form by the following method:—

The nitrobenzene solution obtained at the end of the alkylation is filtered while still hot, yielding a greenish-blue filtrate. The undissolved residue is extracted with boiling nitrobenzene until no more dyestuff dissolves, the solution being then filtered and the combined filtrates evaporated to a small bulk and allowed to cool. The dyestuff crystallizes out and is filtered off and washed with alcohol. The product consists of a brilliant greenish-blue powder dissolving in strong sulphuric acid with a brilliant red-violet colour, which on slow dilution with water becomes first brown, owing to the formation of the sulphuric acid compound, and finally brilliant bluish-green. The dyestuff may be used in the form of a powder, or may be converted into paste by dissolving in strong sulphuric acid and reprecipitating with water, or by dissolving in alkaline hydrosulphite and blowing the dyestuff out again with air.

The product would therefore appear to be a dimethoxy dibenzanthrone.

*Example III.*

The crude methylated dyestuff obtained in Example I may be purified by suspending 1 part in 10 parts of water, adding ¼ part of sodium chlorate, bringing to the boil, and adding slowly 3 parts of commercial hydrochloric acid. The mixture is then boiled for 1 hour, diluted and filtered. The impurities in the original product are now present in the form of alkali soluble bodies and may be removed by dissolving in weak alkali, and filtering. The purified body consists of a green paste which may be used directly as a dye-stuff and is in all respects identical with the product described in Example II.

*Example IV.*

The methylated dyestuff described in Example I forms a compound by combination with sulphuric acid, which compound may be used for purifying and isolating the colour.

1 part of the methylated product is dissolved with stirring in 25 parts of 96% sulphuric acid. To this, water is cautiously added to reduce the concentration of sulphuric acid to 80%. The sulphuric acid compound separates out as a brown amorphous precipitate. This is filtered off over asbestos, and washed with 80% acid, until the filtrates are no longer coloured brown. The precipitate of the sulphuric acid compound, which is of a brown colour, is boiled up with water, which converts it into a brilliant bluish-green paste, and this is then filtered off, washed with water, when it can be used directly for dyeing. The sulphuric acid filtrates contain impurities of little value.

*Example V.*

This is an example of the use of an alkylating agent different from methyl sulphate, that chosen being diethyl-sulphate.

5 parts of the oxidation product of dibenzanthrone in paste form are heated up with 150 parts of nitrobenzene and 10 parts of sodium carbonate until the water is entirely removed. The mixture is then boiled and 10 parts of diethyl sulphate is gradually added through a reflux condenser. Boiling is continued for 3 hours and during this time a blue colour develops in the solution; at the end of the reaction the hot solution is filtered and the residue extracted with hot nitrobenzene until no more dyestuff dissolves. The combined filtrates are evaporated to small bulk and allowed to cool when crystals of the dyestuff separate. These are filtered off and washed with alcohol. The product consists of a purple powder which dissolves in strong sulphuric acid with a violet colour which gives, on dilution, a purple paste. The product dissolves in alkaline hydrosulphite solution with a blue colour and dyes cotton blue shades which, on oxidation and washing, become bluish-violet. These shades are fast to the action of acids, chlorine, and soaping treatment.

*Example VI.*

This is an example of an acylating agent, that chosen being benzoyl chloride.

1 part of the oxidation product of dibenzanthrone is treated with 50 parts of nitrobenzene and 1 part of sodium carbonate by boiling under a reflux condenser and to this suspension is added 2 parts of benzoyl chloride. Boiling is continued for three hours during which a brilliant violet colour develops in the solution. The hot solution is then filtered and the dyestuff is extracted from the residue by treatment with hot nitrobenzene. The combined filtrates are evaporated to a small bulk and allowed to cool. The dyestuff separates as a crystalline powder. This is soluble in strong sulphuric acid with a violet colour which, on slow dilution, becomes first brown, finally purple. It dissolves in cold alkaline hydrosulphite solution with a blue colour and dyes cotton blue shades which, on oxidation, become a clear lilac shade. These shades are fast to the action of acids, soap and chlorine.

*Example VII.*

This is a further example of the use of an acylating agent.

1 part of the oxidation product of dibenzanthrone is heated with one part of fused sodium acetate, 30 parts of nitrobenzene and 2 parts of acetic anhydride under reflux condenser at the boiling point for three hours. The hot solution is filtered and the residue extracted with hot nitrobenzene until the brilliant red violet colour at first present at length disappears. The combined filtrates are evaporated to a small volume and allowed to cool. The acetyl compound crystallizes out in brilliant coppery crystals which are filtered off and washed with alcohol. The product dissolves in strong sulphuric acid with a red violet colour which on dilution becomes first brown and then purple. On treatment with cold alkaline hydrosulphite solution the acetyl compound is at once hydrolyzed so that the solution dyes shades of a brilliant yellow olive representing a very pure form of the original oxidation product of dibenzanthrone. These shades become blue when treated with acid.

*Example VIII.*

1 part of the oxidation product of dibenzanthrone is suspended in 30 parts of nitrobenzene, and to this suspension is slowly added 1 part of phosphorous pentachloride. The solution is then raised to the boiling point, and boiling is continued for several hours. The solution develops an intense red violet colour. At the end of this time the solution is filtered while hot, and the residue extracted with hot nitrobenzene, until coloured filtrates are no longer obtained. The combined filtrates are evaporated to a small volume and the product which separates on cooling is filtered off and washed with alcohol and boiling water. The product dissolves in sulphuric acid with a dull purple colour, yielding a similar precipitate on dilution. It is soluble in alkaline hydrosulphite with a violet blue colour and dyes cotton purple shades which are fast to acid and apparently consists of a dichlor-dibenzanthrone.

*Example IX.*

The oxidation products in general may be purified by treatment with strong sulphuric acid in the particular manner described for the oxidation product of dibenzanthrone below:—

10 parts of the oxidation product of dibenzanthrone in the state of fine powder are dissolved in 400 parts of strong sulphuric acid at 60° C. The correct amount of water is now added to the solution to reduce the concentration of the sulphuric acid to 85%. After allowing to stand for 12 hours the mixture is filtered and washed with sulphuric acid of the same strength. The precipitate consists of a pure form of the oxidation product, and is worked up by diluting with water, boiling up, reducing with sodium bisulphite and filtering.

The purity of the product can be demonstrated by dye tests, and it is found that shades are obtained of a bright yellow-olive colour, considerably more brilliant and intense than can be obtained from the crude product. The acid filtrates contain a further quantity of considerably less pure oxidation product.

The shades obtained from the latter are considerably duller and weaker.

*Example X.*

10 parts of the dyestuff obtained by the fusion with potash of the condensation product of 2-chloranthraquinone with glycerine are dissolved along with 5 parts of crystalline boric acid in 350 parts of strong sulphuric acid. To the solution is added 12 parts of manganese dioxide, the temperature being then raised and maintained at 60° for several hours.

The product is then worked up by diluting with water, boiling up, reducing with sodium bisulphite and filtering. After washing the product consists of 40 parts of paste of a dull brown colour, which gives in strong sulphuric acid a solution unaffected by copper, and giving a green precipitate on dilution.

It dyes cotton blue shades, which are not fast to the action of acids or alkalies.

20 parts of the oxidation product described above are added in the form of a paste to 150 parts of nitrobenzene, along with 10 parts of sodium carbonate.

The water is then removed by heating, and 10 parts of dimethylsulphate then added. After boiling for several hours, during which a bluish-green colour develops, the product is worked up by the method of Example II above.

The product consists of a crystalline powder dissolving in strong sulphuric acid with a brown colour, which, on dilution with water, gives first a brown sulphuric acid compound, which finally becomes bluish-green on the addition of more water.

The dyestuff gives greenish-blue shades on cotton which are fast to the action of chlorine, light and washing.

*Example XI.*

5 parts of dichlor-dibenzanthrone (prepared by treating dibenzanthrone in nitrobenzene solution with sulphuryl chloride) are dissolved along with 2½ parts of crystalline boric acid in 400 parts of strong sulphuric acid. 7½ parts of manganese dioxide are then added and the solution is then raised to and contained at 60° C. for two hours.

The product is worked up by the usual method as described in Example X.

The product consists of 25 parts of a dark yellowish brown paste, which gives in strong sulphuric acid a brilliant red violet colour, and on the addition of water, gives first a brown sulphuric acid compound, and on further dilution, a yellow-olive precipitate.

The product dyes cotton from the hydrosulphite vat yellow-olive shades, which are not fast to the action of acids and alkalies.

*Example XII.*

To typify the action of other alkylating agents on the oxidation products described in the above examples, the following examples are given: —

5 parts of the oxidation product of dibenzanthrone are suspended in 150 parts of nitrobenzene and 5 parts of diphenyl dichlormethane are added.

The solution on boiling assumes a blue colour, and hydrochloric acid is evolved. When the latter ceases the colour is worked up by the method of Example II above.

The product is obtained after crystallizing as a dark crystalline powder, which dissolves in strong sulphuric acid with a brilliant red violet colour, giving on dilution a yellowish-green sulphate, and on further dilution a reddish-blue paste. It dissolves in alkaline hydrosulphite solution with a blue colour, and dyes cotton blue shades, which, on oxidation and washing become bright blue.

These shades are fast to the action of acids and alkalies, and to bleaching and light.

Example XIII.

10 parts of oxidation product of dibenzanthrone are suspended in 150 parts of nitrobenzene, along with 20 parts of dry sodium carbonate. 20 parts of ethylene dibromide are added.

The mixture is then boiled under a reflux condenser for 5 hours. The product is worked up by the method of Example No. II. The solution in nitrobenzene is of a brilliant greenish-blue colour. The product is obtained as a fine microcrystalline powder, which dissolves in strong sulphuric acid with a brilliant red-violet colour, giving an olive-green sulphate on dilution with water, and a blue paste on further addition of water. It dissolves in the hydrosulphite vat with a pure blue colour, and dyes cotton blue shades, which on oxidation and washing become intense greenish-blue.

These shades are fast to acids and alkalies and to the action of bleaching and light.

Example XIV.

10 parts of oxidation product of dibenzanthrone are suspended in 150 parts of nitrobenzene, along with 20 parts of dry sodium carbonate. 20 parts of methylene dibromide are added.

The mixture is then boiled under a reflux condenser for 5 hours. The product is worked up by the method of Example No. II. The solution in nitrobenzene is of a brilliant greenish-blue colour. The product is obtained as a fine microcrystalline powder, which dissolves in strong sulphuric acid with a brilliant red-violet colour, giving an olive-green sulphate on dilution with water, and a reddish-blue paste on further addition of water. It dissolves in the hydrosulphite of water. It dissolves in the hydrosulphite vat with a pure blue colour, and dyes cotton blue shades, which on oxidation and washing become bluish-purple.

These shades are fast to acids and alkalies and to the action of bleaching and light.

Example XV.

5 parts of the oxidation product of dibenzanthrone are suspended in 200 parts of nitrobenzene, with 10 parts of sodium carbonate. Traces of water are removed by heating, and 5 parts of ortho-chlor-benzalchloride are then added. The mixture is then boiled for several hours, during which time a brilliant bluish violet colour develops in the solution, accompanied by a yellowish-red fluorescence.

After a number of hours the product is worked up by the method of Example II above. The product consists of a reddish-blue powder, dissolving in strong sulphuric acid with a brilliant red-violet colour, which on dilution forms a brown sulphate, and finally a reddish blue precipitate. This dissolves in alkaline hydrosulphite with a blue colour, and dyes cotton blue shades which on oxidation and washing become bright reddish blue, similar to those described in Example XIII. These shades are fast to the action of light, washing and bleaching.

Example XVI.

5 parts of the oxidation product of dibenzanthrone are suspended in 200 parts of nitrobenzene and 10 parts of paranitrobenzoyl-chloride are added.

The mixture is then boiled under a reflux condenser; hydrochloric acid is given off, and a brilliant violet solution is obtained.

After several hours, the product is worked up by the method of Example VI. It consists of a purple powder dissolving in strong sulphuric acid with a brilliant red-violet colour, which on dilution gives a violet precipitate. The product dissolves in alkaline hydrosulphite in the cold with a blue colour, and dyes cotton reddish blue shades, which on oxidation and washing become purple.

Example XVII.

1 part of the oxidation product of dibenzanthrone is suspended in 150 parts of nitrobenzene, and 5 parts of phosphorous sulphide added.

The mixture is boiled for several hours, and the dyestuff is then extracted with hot nitrobenzene, according to the method described in foregoing examples.

The product consists of a dark powder which dissolves in sulphuric acid with a dark grey-green colour, giving on dilution a grey precipitate. The product dissolves in alkaline hydrosulphite solutions with a blue colour, and dyes cotton blue shades, which on oxidation become bluish violet. These shades are fast to the action of acids and alkalies and to bleaching.

Example XVIII.

2.5 parts of the oxidation product of dibenzanthrone are suspended in 150 of nitrobenzene, and 5 parts of sulphuryl chloride added; hydrochloric acid gas is evolved and the solution assumes a yellowish brown colour.

After boiling for several hours under reflux condenser, the product is extracted and worked up by the method of Example II. It consists of a dark powder dissolving in alkaline hydrosulphite with a blue colour, and dyes cotton blue shades, which on oxidation become brown. These shades are not fast to the action of acids and alkalies. The product probably consists of a dichlor-derivative of the oxidation product.

Example XIX.

2.5 parts of the oxidation product of dibenzanthrone are suspended in 120 parts of nitrobenzene, and traces of water removed by heating. 3.2 parts of sulphur monochloride are then added; hydrochloric acid gas is evolved, and the colour of the solution, which is originally pale blue, becomes brown. The mixture is boiled under a reflux condenser for several hours when the colour again changes to purplish blue.

The product is worked up by the method of Example II, and consists of a blue powder, which dissolves in alkaline hydrosulphite with a blue colour, and dyes cotton blue shades, which upon oxidation become brilliant silver grey. These shades are not fast to the action of acid.

In the above examples we have used nitrobenzol as the medium for carrying out the alkylation or acylation of the different oxidation products or their reduced derivatives, but we do not confine ourselves to the use of nitrobenzol, as the reaction can be carried out quite readily in other solvents which do not interfere with the reaction, such as nitrotoluol, naphthalene. The reaction may also be carried out without a diluent in the presence of the alkylating or the acylating agent.

In the preparation of the oxidation products described above we have mentioned the use of manganese dioxide and sulphuric acid, but other oxidizing agents such as nitric acid can be employed with suitable results. The parent bodies containing the perylene nucleus may also be nitrated, reduced, diazotized and boiled to form oxycompounds that behave in general similarly to those described above.

Having now described our invention, what we claim as new and desire to secure by Letters Patent is:—

1. Organic derivatives of the oxidation product of ketonic perylenes.

2. Organic derivatives of the oxidized and subsequently mildly reduced products of ketonic perylenes.

3. Alkyl derivatives of the oxidation products of ketonic perylenes.

4. Alkyl derivatives of the oxidized and subsequently mildly reduced products of ketonic perylenes.

5. The process of producing coloring matters of the anthraquinone series by introducing an organic radicle into the oxidation products derived from a ketonic perylene.

6. The process of producing coloring matters of the anthraquinone series by introducing an organic radicle into the oxidation products of a ketonic perylene which have been subsequently reduced.

7. A process for purifying crude organic derivatives of ketonic perylene bodies which includes the step of acting thereon by nascent chlorine.

8. An organic derivative of the oxidation product of ketonic perylenes containing an even number of ketonic groups.

9. Organic derivatives of the oxidation product of ketonic perylenes mildly reduced containing an even number of ketonic groups.

10. Alkyl derivatives of the oxidation product of ketonic perylenes containing an even number of ketonic groups.

11. Alkyl derivatives of the oxidation product of ketonic perylenes mildly reduced containing an even number of ketonic groups.

12. Alkyl derivatives of the oxidation product of ketonic perylenes containing two ketonic groups.

13. Alkyl derivatives of oxidized dibenzanthrones.

14. Alkyl derivatives of oxidized dibenzanthrone after treating the latter with reducing agents.

15. Alkyl derivatives of oxidized dibenzanthrone, after treating the latter with sodium bisulphite.

16. New products obtained by treating with strong sulphuric acid the alkylated derivatives of the mildly reduced oxidation products of ketonic perylenes.

17. The product formed by treating the oxidation product of dibenzanthrone with ethylene-dibromide in hot nitro-benzol suspension in the presence of a mild alkali.

18. A hydrocarbon radical derivative of an oxidation product of a ketonic perylene.

In testimony whereof we have signed our names to this specification.

MARY OLIVIA DAVIES,
*Administratrix of Arthur Hugh Davies, Deceased.*

R. FRASER THOMSON.